No. 741,803. PATENTED OCT. 20, 1903.
W. LOUDEN.
CROSS TIMBER CLAMP.
APPLICATION FILED APR. 27, 1903.
NO MODEL.
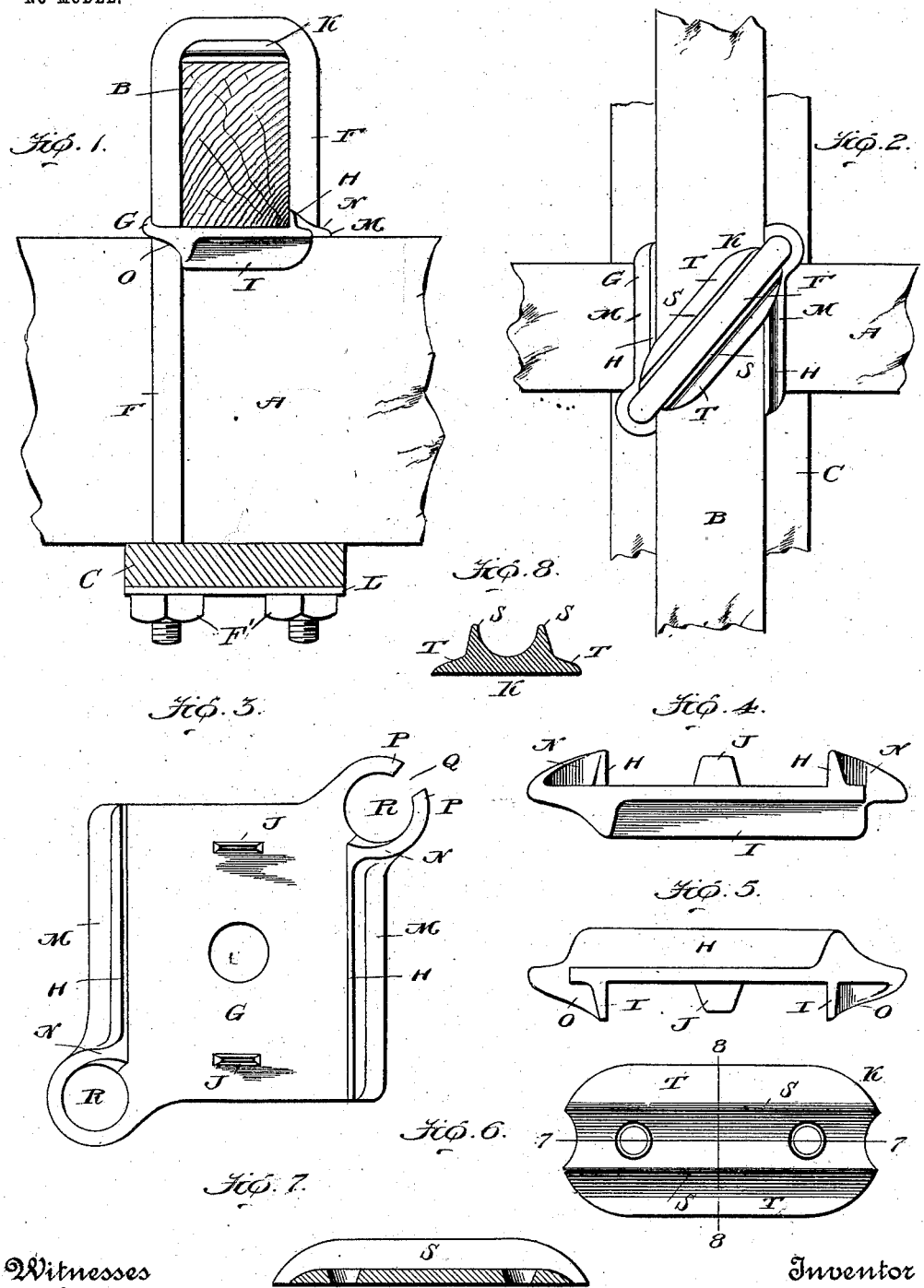
Witnesses
Inventor
William Louden.

No. 741,803. Patented October 20, 1903.

UNITED STATES PATENT OFFICE.

WILLIAM LOUDEN, OF FAIRFIELD, IOWA.

CROSS-TIMBER CLAMP.

SPECIFICATION forming part of Letters Patent No. 741,803, dated October 20, 1903.

Application filed April 27, 1903. Serial No. 154,498. (No model.)

*To all whom it may concern:*

Be it known that I, WILLIAM LOUDEN, a citizen of the United States, residing at Fairfield, in the county of Jefferson and State of Iowa, have invented a new and useful Improvement in Cross-Timber Clamps, of which the following is a specification.

My invention relates to clamps for holding the timbers of hay-racks and other similar structures together without boring holes through the main parts thereof; and it consists of an improvement in the details, which is hereinafter set forth.

In the accompanying drawings, Figure 1 is an elevation showing the clamp applied to the timbers, the upper and lower timbers being shown in section. Fig. 2 is a top or plan view of the same. Fig. 3 is a plan view of the intermediate metal plate. Fig. 4 is a side view, and Fig. 5 is an end view, of the same. Fig. 6 is a plan view of the top washer. Fig. 7 is a sectional view on the line 7 7 of Fig. 6. Fig. 8 is the same on line 8 8 of same figure.

In the drawings, A represents one of the main timbers of a hay-rack, and B and C upper and lower cross-timbers of the same. F is an inverted-U-shaped bolt having two nuts F' and so arranged as to diagonally straddle said timbers.

G is a metal plate which has parallel flanges H and I on its opposite sides, the flanges on one side being set at right angles to those on the opposite side. These flanges are so spaced that they will embrace the edges of the timbers A and B, between which they are inserted. They are preferably fitted with spurs J on each side, which cut into the faces of the timbers A and B and with the flanges H and I serve to prevent the timbers from slipping on each other.

K is an elongated washer positioned between the bow of the bolt F and the upper timber B, and L is a yoke placed below the timber C and having holes in its ends, through which the ends of the bolt F are passed. The plate G is provided with eyes or openings R, through which the ends of the bolt are also passed, the whole serving to hold the timbers together in the usual manner. Outside of the flanges H and I the plate is provided with additional bearing portions M, which may be extended to any desired extent to increase the bearing-surface of the timbers A and B on the plate G, and thus prevent the plate from cutting into the timbers. Adjoining the flanges H and I and set substantially at right angles to them are auxiliary flanges N and O. These auxiliary flanges are made to follow the curve of the portions which form the eyes through which the bolt F is passed and are tapered off and merged into said portions when part way round the bolt. These auxiliary flanges not only strengthen these portions, but also strengthen the ends of the flanges H and I, to which they are connected, and permit the same to be made of the greatest lightness, while retaining equal strength. The eyes R are usually made to entirely surround the bolt F; but a preferable way is to make them with an opening Q, as shown in one of the eyes in Fig. 3. It frequently happens that different-sized bolts are used, and when this is done the eye to admit the larger size will be too large to properly fit the smaller size. By making the plates G of malleable metal with this opening in the eyes the points P can be closed against the smaller bolts, and thus always insure a neat fit. The auxiliary braces N will strengthen the points P, and thereby make them amply strong for the purpose required.

The washers K are fitted with parallel ribs S, running lengthwise thereon and spaced so as to form a seat for the bow of the bolt F. The ends of the washer between these ribs are made concave, and the edges therein are rounded off, so as to fit the bend of the bolt. The body of the washer is made thin and is extended laterally, so as to form bearing-surfaces T on each side of the ribs S, so as to prevent it from cutting into the timber B. Openings may be made in the body of the washers, as shown, by means of which it may be secured to the timber B.

If preferred, the timber C may be dispensed with and the yoke L applied direct to the lower edge of the timber A.

What I claim is—

1. In cross-timber clamps, an intermediate metal plate having parallel flanges on opposite edges, set and spaced to embrace the opposite sides of one of the timbers, a portion of the plate being extended beyond said flanges to form additional bearing-surfaces on the other timber, and a clamp to hold the timbers and plate together.

2. In cross-timber clamps, an intermediate metal plate having parallel flanges on opposite edges, set and spaced to embrace the opposite sides of the adjoining timber, eyes in the opposite corners of said plate, auxiliary flanges joining one end of said parallel flanges and set substantially at right angles thereto, said auxiliary flanges being merged into the portions forming said eyes, and a clamp to hold said timbers and plate together.

3. In cross-timber clamps, an intermediate metal plate having an eye in one or more of its corners with an opening in said eye which is adapted to be closed, and a clamping-bolt passed through said eye to hold the timbers and plate together.

4. In cross-timber clamps, an intermediate metal plate, having parallel flanges on opposite edges set and spaced to embrace the opposite sides of the adjoining timber, an eye in one or more of the corners of said plate with an opening in said eye which is adapted to be closed, and a clamping-bolt passed through said eye to hold the timbers and plate together.

5. The combination of crossed timbers, a U-shaped clamping-bolt to diagonally straddle said timbers, and a metallic washer diagonally disposed upon the upper edge of one of the timbers and under the bow of the bolt, parallel flanges being formed lengthwise on the upper side of said washer and spaced to form between them a seat for the bow of the bolt, and the ends of the washer between said flanges being concaved to fit the bend of the bolt.

6. The combination of crossed timbers, a U-shaped clamping-bolt to diagonally straddle said timbers, and a metallic washer diagonally disposed upon the upper edge of one of the timbers and under the bow of the bolt, parallel flanges being formed lengthwise on the upper side of said washer and spaced to form between them a seat for the bow of the bolt, and the thin body of the washer being extended beyond the flanges so as to form additional bearing-surfaces on the timber.

In witness whereof I have hereunto subscribed my name in the presence of two witnesses.

WILLIAM LOUDEN.

Witnesses:
V. W. MIDDLETON,
N. E. EMERSON.